(12) United States Patent
Fairchild

(10) Patent No.: US 10,714,293 B1
(45) Date of Patent: Jul. 14, 2020

(54) CARBON NANOTUBE FIBER CARPET STRUCTURE

(71) Applicant: Government of the United States, as Represented by the Secretary of the Air Force, Wright-Patterson AFB, OH (US)

(72) Inventor: Steven B Fairchild, Beavercreek, OH (US)

(*) Notice: Subject to any disclaimer, the term of this patent is extended or adjusted under 35 U.S.C. 154(b) by 0 days.

(21) Appl. No.: 16/655,676

(22) Filed: Oct. 17, 2019

Related U.S. Application Data

(60) Provisional application No. 62/746,958, filed on Oct. 17, 2018.

(51) Int. Cl.
*H01J 1/304* (2006.01)
*C01B 32/168* (2017.01)
*C08K 3/04* (2006.01)

(52) U.S. Cl.
CPC .......... *H01J 1/3042* (2013.01); *C01B 32/168* (2017.08); *C08K 3/041* (2017.05); *C01B 2202/08* (2013.01); *H01J 2201/3043* (2013.01); *H01J 2201/30469* (2013.01)

(58) Field of Classification Search
CPC .......... H01J 1/3042; H01J 2201/30469; H01J 2201/3043; C08K 3/041; C01B 32/168; C01B 2202/08
See application file for complete search history.

(56) References Cited

U.S. PATENT DOCUMENTS

| | | | |
|---|---|---|---|
| 8,766,522 B1 | 7/2014 | Fairchild et al. | |
| 2008/0170982 A1* | 7/2008 | Zhang | C01B 32/15 423/447.3 |
| 2017/0283263 A1* | 10/2017 | Humfeld | C01B 32/162 |
| 2018/0290884 A1* | 10/2018 | Kessler | C01B 32/168 |
| 2019/0062163 A1* | 2/2019 | Nguyen | C01B 32/164 |

* cited by examiner

*Primary Examiner* — Donald L Raleigh
(74) *Attorney, Agent, or Firm* — AFMCLO/JAZ; Timothy M. Barlow

(57) ABSTRACT

A carbon nanotube fiber carpet structure includes a backing material; and a plurality looped carbon nanotube (CNT) fiber conductors fixed to the backing material extending outward from the backing material in an array. The CNT fiber conductor may include at least one of a CNT thread, a CNT fiber, a CNT film, and a CNT ribbon, and the CNT fiber conductor may include a first end and a second end, the first end fixed to the backing material, and the second end fixed to the backing material a predetermined distance from the first end in order to form a loop of the CNT fiber conductor extending away from a backing material surface. The CNT fiber conductor may be woven into the backing material to form a plurality of loops of the CNT fiber conductor extending away from a backing surface material, and the backing material may be a conductive material.

8 Claims, 15 Drawing Sheets
(14 of 15 Drawing Sheet(s) Filed in Color)

CNT Fiber Cathode

- Lower Turn-On Voltage
- 350X More Current for same field strength
- Less Plasma Formation

| Fiber | Electrical Conductivity | Thermal Conductivity |
|---|---|---|
| CNT | 8.5 MS/m* | 400 W/mK |
| Graphite | 0.083 MS/m* | ~100 W/mK |

* DexMat * ESL

FIG. 10

CARBON NANOTUBE FIBER CARPET STRUCTURE

Pursuant to 37 C.F.R. § 1.78(a)(4), this application claims the benefit of and priority to prior filed Provisional Application Ser. No. 62/746,958, filed Oct. 17, 2018, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to carbon nanotube structures and, more particularly, to carpet structures incorporating carbon nanotubes.

BACKGROUND OF THE INVENTION

Carbon nanotube (CNT) fibers have demonstrated significant promise as field emission (FE) cathodes due to their large aspect ratios and high electrical and thermal conductivities. They can potentially be used as FE cathodes in a wide range of applications, including compact radiation sources, electron guns for ring and linear accelerators, and vacuum nanoelectronics. CNT fibers are also extremely flexible and do not lose conductivity when bent. This allows for their arrangement in various cathode geometries other than the typical free standing vertical emitter.

Carbon nanotube (CNT) fiber-based emitters have shown great potential to deliver stable, high current beams for various potential applications. However, because of joule heating, traditional CNT field emitters are heated to high temperatures during field emission; it is important to improve the thermal management of such emitters to increase their reliability and prevent premature failure.

The current state of the art cathode material for use in High Power Microwave (HPM) devices is made from graphite fiber. The devices are made by a technique called flocking, whereby the stiff and rigid graphite fibers are electrostatically implanted into an epoxy base. This makes a graphite fiber carpet of vertically-aligned fibers that may be used as a cathode in HPM systems.

Prior art CNT fiber emitters are typically mounted vertically on a substrate, i.e. the CNT fibers are orthogonal to the substrate, in order to take advantage of the high field enhancement factor due to their high aspect ratio. The tips of the fibers are cut either mechanically or by a laser. However, the mechanically-cut tips usually introduce rough edges with dangling fibrils (see FIG. 1). Laser cutting largely reduces the tip roughness, however, the fiber tips are still spread out at the ends, i.e. frayed ends. The rough edges of the frayed ends and tip spread are undesirable. They lead to non-uniform emission and uneven temperature distribution and hotspots at the fiber tips.

SUMMARY OF THE INVENTION

The present invention overcomes the foregoing problems and other shortcomings, drawbacks, and challenges of field emission cathodes using CNTs. While the invention will be described in connection with certain embodiments, it will be understood that the invention is not limited to these embodiments. To the contrary, this invention includes all alternatives, modifications, and equivalents as may be included within the spirit and scope of the present invention.

CNT fibers are far superior electron emitters than graphite fibers, emitting up to 350× more current under the same applied field strength. The flexibility of CNT fibers allows them to be sewn or woven using existing textile fabrication techniques; the specialized flocking technique is no longer required. Woven CNT fiber loops also offer the advantage of improved thermal management over vertically-implanted CNT fibers due to their thermal contact with a substrate at both ends of the fiber.

According to one embodiment of the present invention.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention. The patent or application file contains at least one drawing executed in color. Copies of this patent or patent application publication with color drawing(s) will be provided by the Office upon request and payment of the necessary fee.

FIG. 10 presents a chart of performance characteristics of a prior art graphite fiber cathode and a CNT fiber cathode according to an embodiment of the present invention;

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 2:
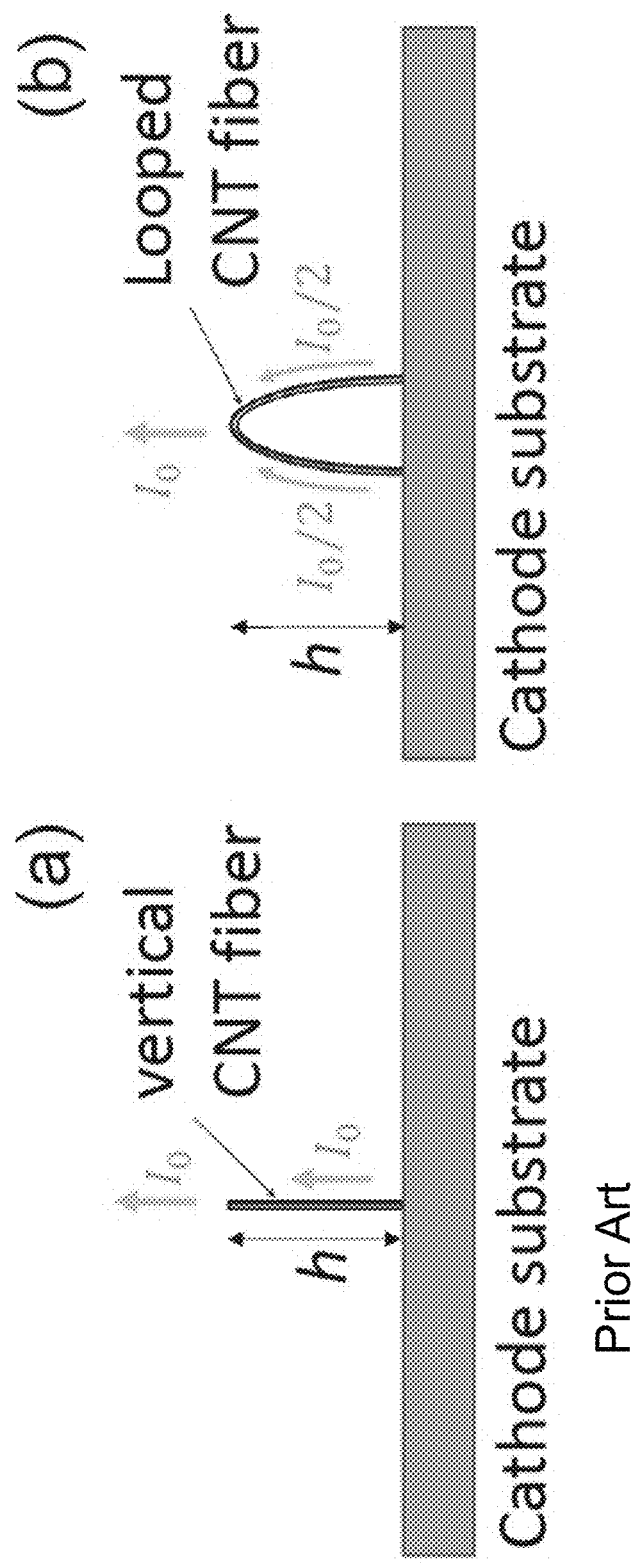
FIG. 2 presents schematics of a prior art field emitter configuration (image (a)) as well as a configuration according to the present invention (image (b))

To avoid the problems that are introduced by the spreading out of the fiber tips, or frayed ends, we have taken advantage of the high flexibility of the CNT fiber to form an emitter by looping it (FIG. 2, image (b)), so that electron emission occurs from a well-rounded fiber loop, instead of a rough tip edge.

Figure 1:
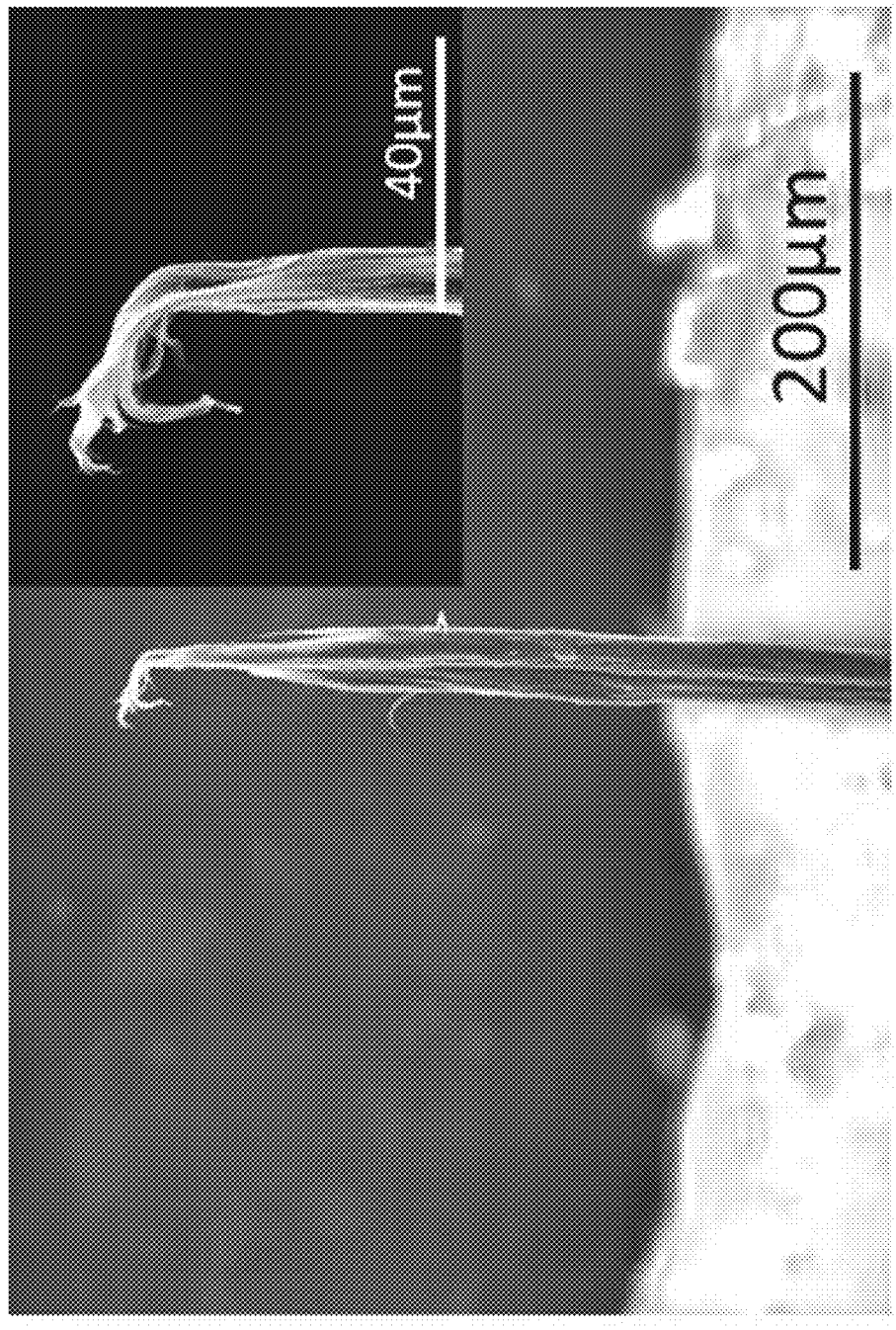
FIG. 1 presents a scanning electron microscope (SEM) image of a prior art typical single vertical carbon nanotube (CNT) fiber with the tip cut with a razor.

As mentioned above, a problem with prior art vertical fiber emitters is their limited heat conduction and poor thermal management because of the single contact point to the cathode base (FIG. 1 and FIG. 2, image (a)). In order to produce stable, high current beams, it is important to develop cathodes with improved thermal management properties, including reliable thermal stability, better thermal conduction and circulation, and reduced temperature during current emission. Despite their exceptional thermal conductivity, the maximum temperature of individual CNT field emitters can reach 2000 K near the emitter tip during field emission because of joule heating. For CNT fiber based cathodes, a temperature of >500° C. can be reached routinely during mA level current emission. The high temperature could potentially increase the resistance of the emitter, degrade the performance of the emission, limit the stability and reliability, and eventually lead to the failure of the field emitters. It is thus highly desirable to have a new configuration of CNT fiber emitters with better thermal handling capabilities. A looped fiber emitter is one such candidate since it provides an additional heat conduction path to the cathode base (FIG. 2, image (b)).

Herein we compare the field emission characteristics and the temperature distribution of a new and novel configuration of a looped CNT fiber emitter with a traditional single vertical CNT fiber emitter. It was found that the maximum temperature of the looped fiber emitter (~300° C.) is significantly reduced compared to that of the vertical fiber (~600° C.) at the same emission current of 3 mA.

There are ongoing efforts to better understand the heating and temperature distribution of CNT fiber field emitters, including direct Infrared (IR) imaging, a multiscale model of heat dissipation, coupled electrical-thermal conduction with the effects of temperature dependent electrical and thermal conductivities, morphology dependent field emission, and the effects of contact resistance. Our efforts are directed toward field emission from a looped CNT fiber emitter (FIG. 2, image (b)) as compared with the temperature distribution of a single vertical CNT fiber emitter (FIG. 2, image (a)). Because of the additional heat conduction path to the cathode base, the looped emitter was hoped to reach a lower temperature during field emission. Direct IR imaging shows that the maximum temperature of the looped fiber (~300° C.) is significantly lower than that of the vertical fiber (~600° C.) at the same emission current of 3 mA.

We have developed a looped carbon nanotube arrangement and associated method to scale up carbon nanotube (CNT) fibers into large area conformable carpets, i.e. a carbon nanotube fiber carpet structure, field emitter, electron emitter, or conformable electrode, for large area coverage. This involves weaving, sewing, bonding, or knitting the CNT fibers into a mesh, foil, or cloth substrate. CNT fiber loops protrude from the top side of the substrate like a loop carpet. For electrical applications requiring high conductivity, the substrate may be a conductive material, e.g. a metallic mesh, metal foil, or conductive cloth. A conductive bonding contact between the CNT fiber and the conductive substrate may be formed on the bottom side of the substrate after the CNT fiber has been sewn on, knitted into, or woven through the substrate. Electrical contact (conductive bonding) created between the CNT fiber and the substrate, e.g. metal wire mesh, may be created with a bond formed by electroplating, carbon-based epoxies, or similar means.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

EXPERIMENTAL

CNT fibers can be fabricated by a variety of methods. The CNT fibers for these experiments were fabricated from concentrated dispersions of CNTs via a wet spinning technique. Prefabricated CNTs were dissolved in a superacid at a concentration of 2-8 wt % and were filtered to remove particles in order to form a spinnable liquid crystal dope. This ordered CNT dope was extruded through a spinneret (65-130 μm diameter) into a coagulant (acetone or water) to remove the acid in a controlled fashion to produce continuous lengths of macroscopic neat CNT fibers. The spun fibers exhibited very high nanotube packing density and alignment. The fibers were comprised of primarily double walled CNTs with an uncontrolled distribution of chiralities and types (metallic versus semiconductors), with a diameter of ~2.4 nm and an aspect ratio of ~2600-2800. It is understood that CNT aspect ratio and purity are important for obtaining CNT fiber with good electrical and mechanical properties. Additionally, improved CNT alignment and packing density in the CNT fibers has shown to lead to improved field emission performance and cathode lifetime.

The 3 Omega method was used to measure both the thermal ($\kappa$) and electrical ($\sigma$) conductivities of the fiber samples, which is described here briefly. The sample was prepared by placing four silver epoxy contacts (EPO-TEK H20) in-line on a sapphire substrate (approximately 1 mm apart and 1 mm high). The substrate was mounted in a vacuum micro probe station with temperature control (MMR Technology Micro Probe chamber, $1\times10^{-8}$ Torr). The fiber was placed on top of the electrodes to form a 4-point probe electrical conductivity configuration.

Due to the temperature coefficient of the resistivity of the fiber, a voltage change is induced when the temperature of the fiber varies with the frequency and the amplitude of the current. Electrical conductivity measurements utilize the 1st harmonic with the current that is low enough to prevent Joule heating, and thermal conductivity measurement utilizes the 3rd harmonic with a high current to induce Joule heating.

Figure 3:
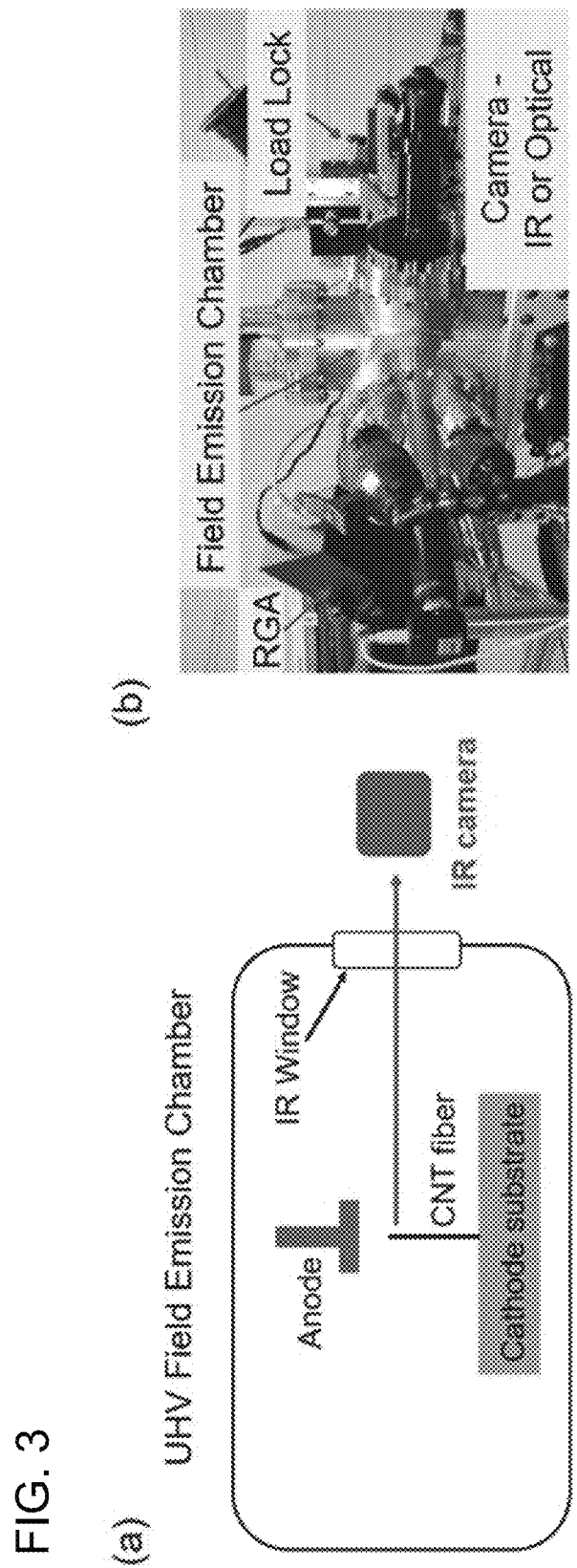
FIG. 3 presents an experimental setup for field emission measurements and infrared (IR) or optical imaging of the disclosed embodiments.

FE measurements were performed in a custom designed ultra-high vacuum (UHV) chamber in a background pressure of $5.0 \times 10^{-9}$ Torr in a diode configuration, as shown in FIG. 3. The CNT fibers were mounted with silver paint between 20 mm×5 mm×1 mm Cu tabs stacked together to make a block sample base. The CNT fiber emitters were prepared in two configurations: a single fiber standing vertically on the substrate, and a fiber loop with both ends attached to the substrate, both as shown in FIG. 2. To maintain the same height from the Cu cathode base, the CNT fiber used for the looped emitter is cut slightly longer than twice the length of that for the vertical emitter. To form the looped emitter, one end of the longer CNT fiber was mounted on the Cu base with silver paint first, the other end was then secured on the Cu base to have about 2 mm separation between the two ends. In both cases, the average diameter of the fiber is 21.3 µm, and the height of the emitter is approximately 4 mm. A stainless steel anode probe tip (7 mm diameter) was aligned with the CNT fiber emitter. The anode-cathode substrate gap distance is adjusted for each configuration to keep 3 mA emission current. The single fiber and loop fiber has the gap (from the emitter apex to anode) at 1.5 mm and 2 mm, respectively. A Keithley 2410 sourcemeter was used for providing voltages up to 1 kV and measuring the current. During FE measurements, the voltage was ramped up from 0-1 kV at 1 s per volt.

Thermal images were captured through an Infinity K2 long-distance microscope with a Xenics Xeva 640 InGaAs array camera with a resolution of 640 by 512 pixels and an optical response between 900 nm and 1.7 µm, as shown in FIG. 3. The integration time that was used to capture the images was 2 ms, and the InGaAs sensor was cooled to −10° C. To obtain the fiber temperatures, a calibration was performed at multiple integration times using the Xenics camera and the Infinity long-distance microscope against a blackbody source. Post-processing the captured images against the calibration data produced temperature information for the points along the length of the fibers.

Results

Figure 4:
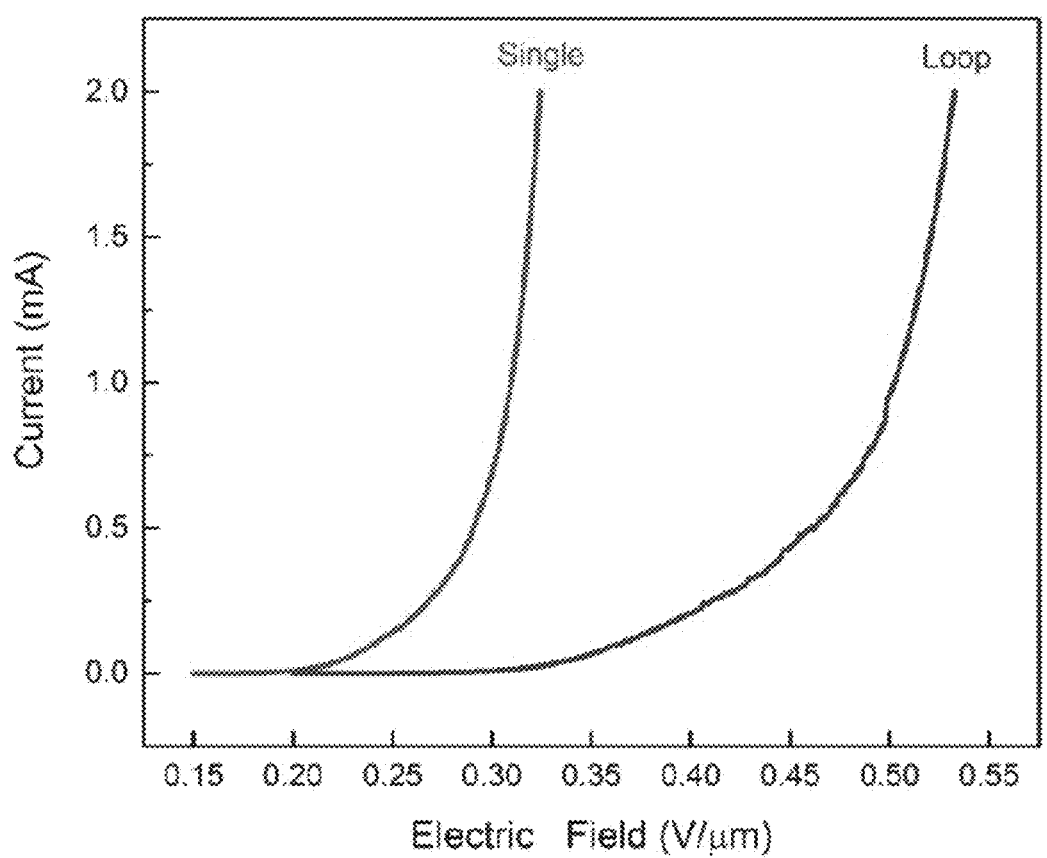
FIG. 4 presents current-voltage (I-V) curves for both a single vertical CNT fiber emitter and a looped CNT fiber emitter.

FIG. 4 shows the FE current data from the single vertical CNT fiber and the looped CNT fiber. For both emitters, the current emission level on the order of several mAs can be easily achieved from a single CNT fiber, confirming the excellent properties of the CNT fibers as field emitters. To reach the same current emission level, the looped CNT fiber emitter requires a larger applied electric field as compared to the single vertical fiber emitter. For example, at a current level of 2 mA, the applied electric fields for the looped and vertical fibers are 0.53 V/µm and 0.32 V/µm, corresponding to an applied voltage of 800 V and 650 V, respectively. This is due to the lower effective field enhancement factor ($\beta_{eff}$ in Equation (1) below) of the looped fiber, because of its smaller aspect ratio and the minimized sharp edges as compared to those of the vertical fiber (FIG. 2, image (a)).

Figure 5:
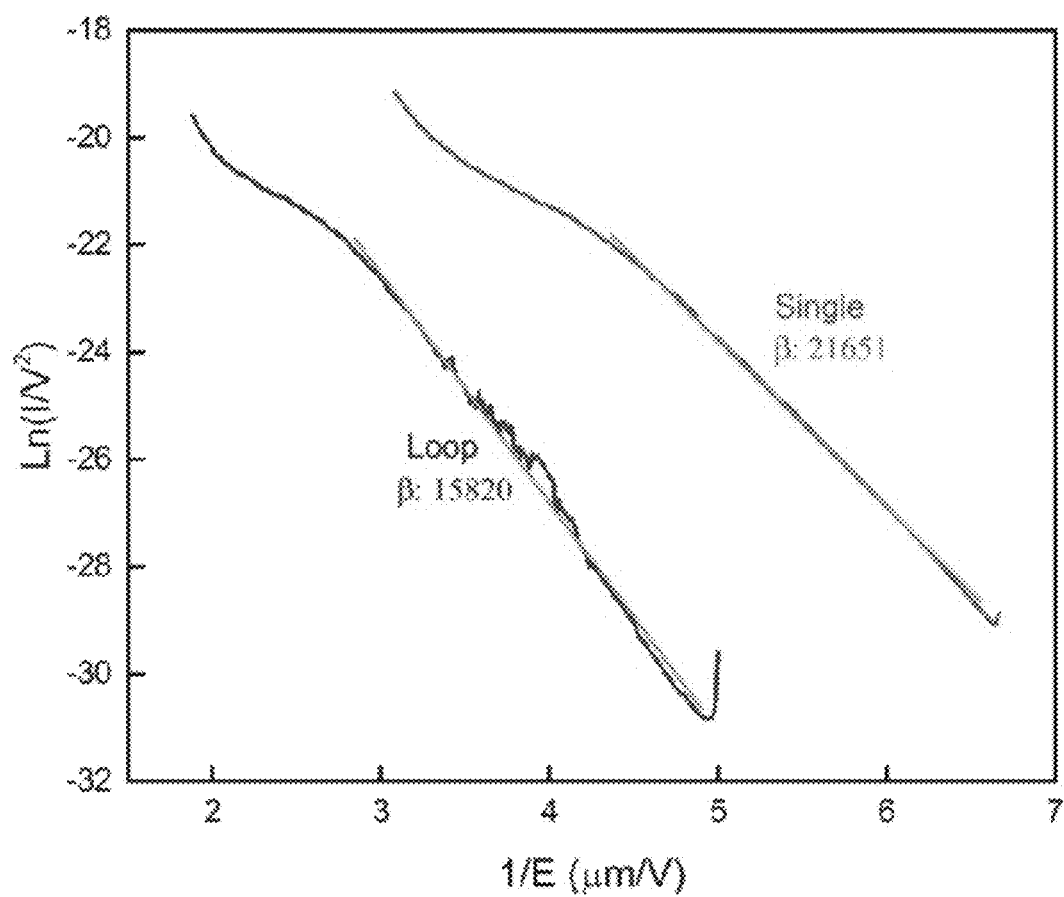
FIG. 5 presents a Fowler-Nordheim (F-N) plot of the measured I-V curves of FIG. 4 for both the looped and single vertical CNT fiber emitters.

FIG. 5 shows the Fowler-Nordheim (FN) plot of the measured I-V curves in FIG. 4 for both the looped and the single vertical CNT fibers. For FN FE, the current-gap voltage characteristics could be fitted by the FN equation, $$I(A) = S_{eff} A (\beta_{eff} E)^2 e^{-\frac{B}{\beta_{eff} E}} \qquad (1)$$

where $A=1.54 \times 10^{-6}$/W, $B=6.83 \times 10^9$ W$^{3/2}$, $S_{eff}$ is the effective emission area (m$^2$) of the fiber, W is the work function (in eV) of the emitting surface, $\beta_{eff}$ is the effective field enhancement factor, $E=V_g/D$ (in V/m) is the gap electric field, D is the gap distance between the anode and the base of the CNT fiber cathode, and $V_g$ is the gap voltage. In the FN plot, Equation (1) yields a straight line when plotted as ln $(I/V_g^2)$ vs. 1/E, with a slope of $-B/\beta_{eff}$. By assuming the gap voltage is the same as the external applied voltage, $V_g = V_{ext}$ (i.e., no series resistance to the emitter is assumed), the measured FN data can be fitted by a straight line when the applied voltage is small, as shown in FIG. 5. From the slope of these linear fittings, the effective field enhancement factor is extracted to be $\beta_{eff}$=15,820 and 21,651 for the looped fiber and the vertical fiber, respectively. In the curve fitting, a constant work function of W=4.8 eV is assumed for both CNT fiber emitters.

The slope drop in the high electric field regime is usually attributed to space charge effects, outgassing of the field emitter, series bulk resistance or contact resistance of the emitter.

Temperature Distribution Measurement and Analysis

Figure 6:
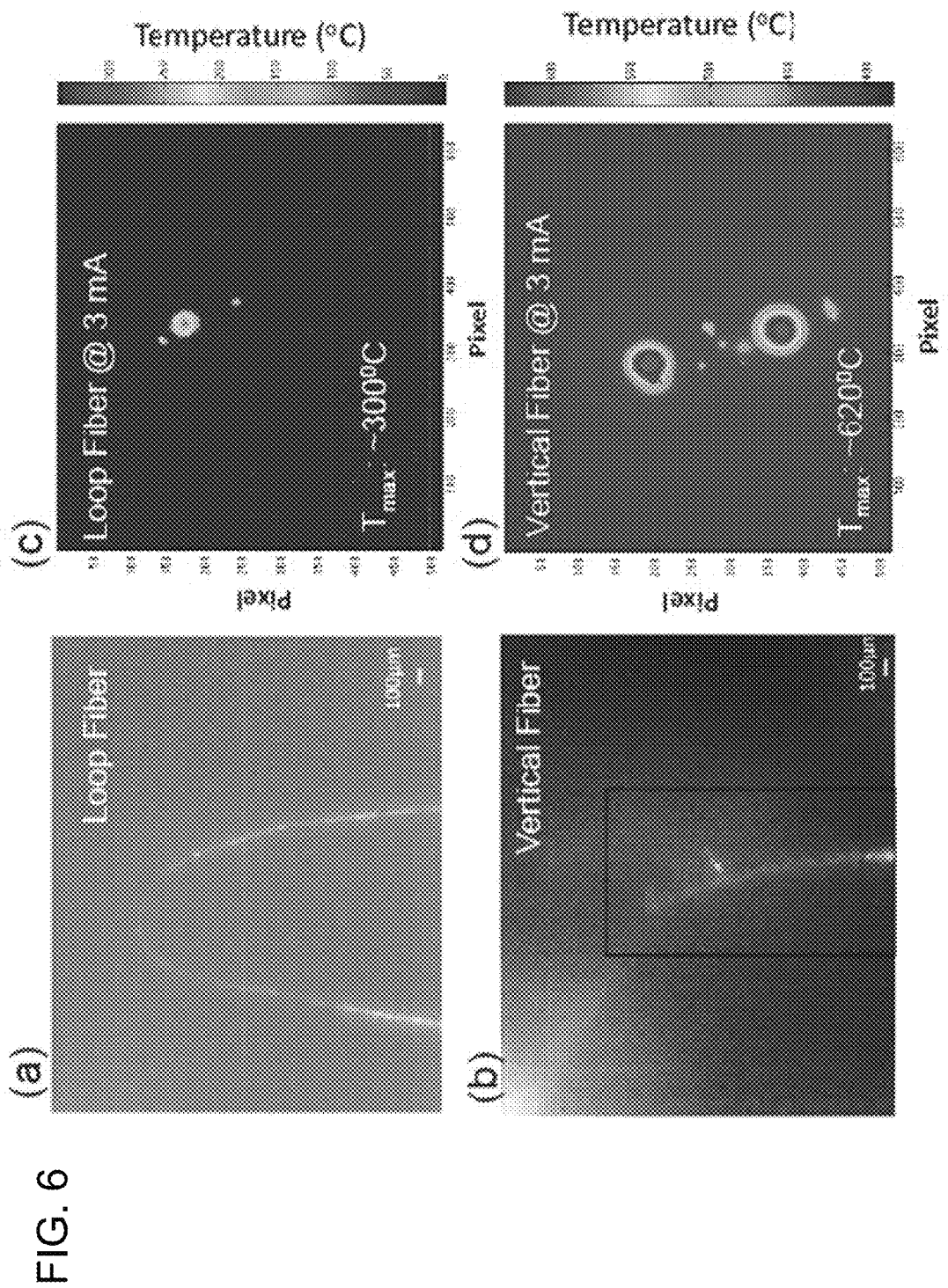
FIG. 6 presents an optical image of the temperature distribution of a looped CNT fiber and a vertical CNT fiber.

FIG. 6 presents optical images of the looped CNT fiber (image (a)), and a single vertical CNT fiber (image (b)), as well as the temperature distribution of the looped CNT fiber (image (c)), and the vertical CNT fiber (image (d)), obtained from an IR camera. Due to Joule heating, the temperature of the CNT fibers will be increased. The temperature distributions of both the looped and single vertical CNT fibers were measured directly with an IR camera at the emission current of 3 mA, as shown in FIG. 6. It is important to note that even though a higher applied voltage is needed to achieve 3 mA emission current for the looped CNT fiber, its maximum temperature is only around 300° C., which is approximately half of the maximum temperature of about 600° C. in the single vertical CNT fiber. The location of the maximum temperature is very close to the top for the looped fiber emitter, whereas for the vertical fiber emitter, besides the hotspot near the emitter tip, there is a second hotspot around 1 mm below the tip.

It is also important to note that, at a given current level, the exact location of the hottest spot depends on the following two factors. The first one is the local emission site, which is related to surface defects, roughness, and/or dangling fibrils along the CNT fiber. The other factor is the self-consistent coupled electrical-thermal conduction along the fiber, which is governed by Equation (2) below. For the looped fiber, both ends are attached to the same substrate with the same temperature and thus, by symmetry, the maximum temperature occurs at the middle point (i.e., the tip) of the looped fiber. For the vertical fiber, Joule heating produces excessive heat inside the fiber, which can only be conducted away (ineffectively and unsymmetrically as compared to the looped configuration) from the two ends of the fiber, resulting in heat built up inside the fiber, with a maximum temperature that is located apart from its ends.

Figure 7:
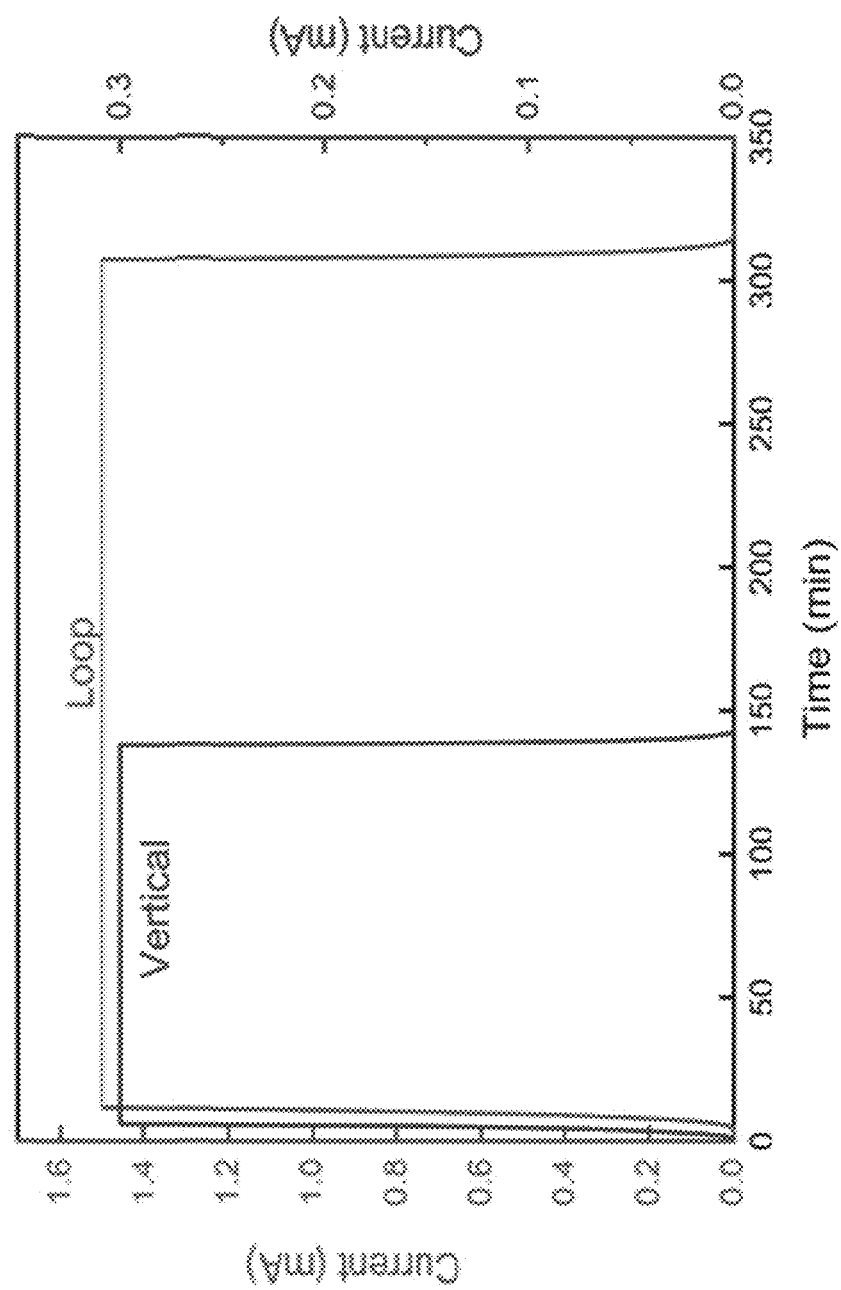
FIG. 7 presents long-term stability measurements for both the vertical and looped CNT fiber emitters.

Emission stability was measured for both emitters, as shown in FIG. 7. The emission current was measured for 120 min at the current level of 0.3 mA for the vertical CNT configuration, while the looped fiber emission was monitored for 300 min under the current level of 1.5 mA. We observed the long-term stability of both of the emission configurations.

Figure 8:
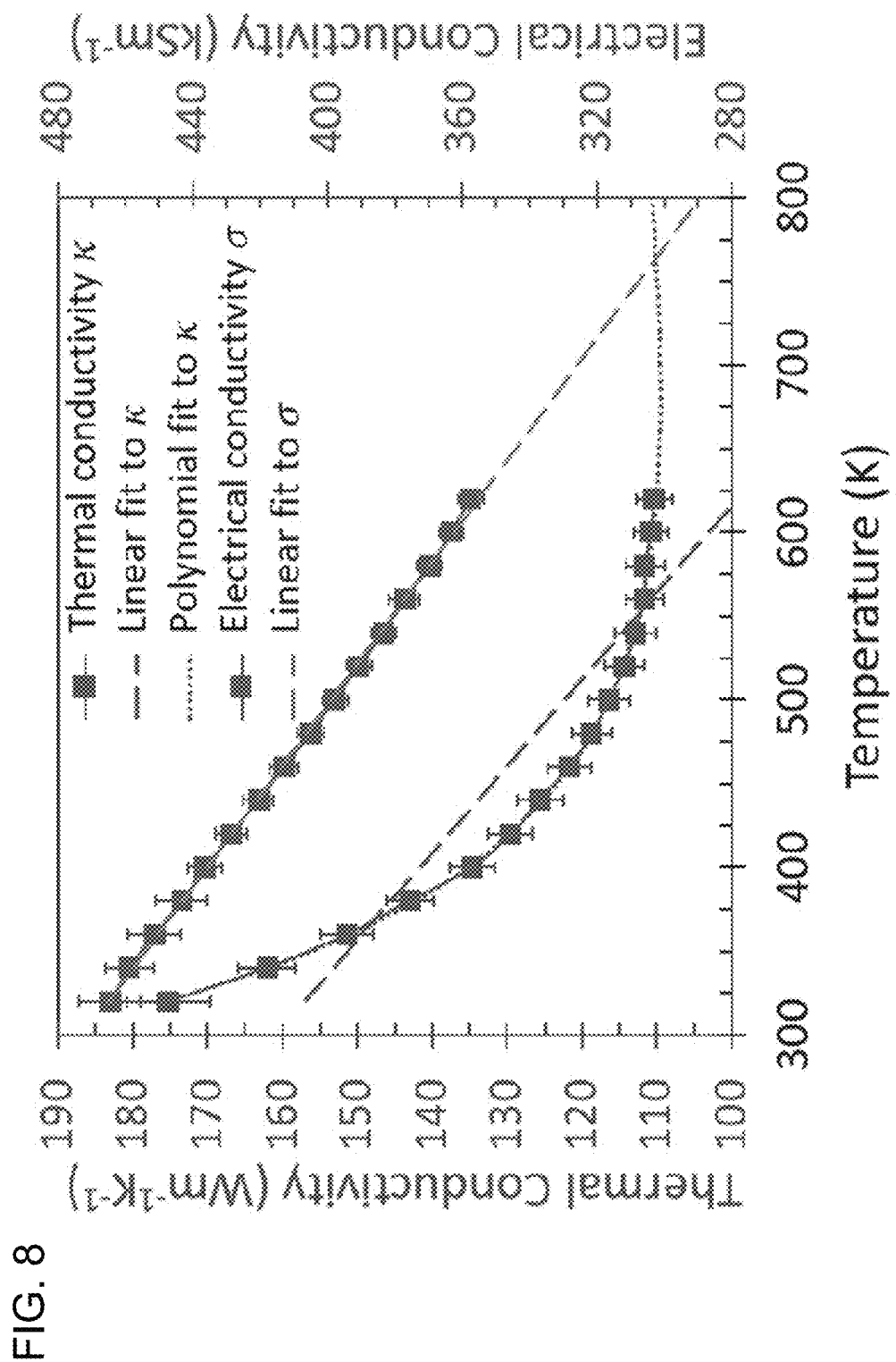
FIG. 8 presents the temperature dependent thermal and electrical conductivities of a CNT fiber, measured from the 3 Omega method.

To better understand Joule heating and the thermal properties of the CNT fiber emitters, the temperature dependent electrical (σ) and thermal (K) conductivities of the CNT fiber (sample from the same fabrication batch as those used in the emitters) were measured using the 3 Omega method, as shown in FIG. 8. FIG. 8 presents temperature dependent thermal and electrical conductivities of the CNT fiber, measured from the 3 Omega method. Dashed lines are for a linear fit to the electrical conductivity, σ[S/m]=−366.09T [K]+582,096 and to the thermal conductivity, κ[W/mK]= −0.1298T[K]+218.75. Dotted lines are for a polynomial fit to the thermal conductivity, κ[W/mK]=2.4×10$^7$/T[K]$^2$−70, 369/T[K]+161.11. These curve fittings are used in Equation (2) to estimate the maximum temperature in the fiber emitters. As temperature T increases, the electrical conductivity decreases linearly; whereas the thermal conductivity decreases strongly before T=500 K and then gradually saturates afterwards. We next compared the experimental measured temperature distribution with a recent theory on the Joule heating of a one dimensional conductor, with the above measured temperature dependent electrical and thermal conductivities as inputs.

From the steady-state heat conduction equation and the electrical current continuity equation, we have $$\frac{d}{ds}\left(\kappa(T,s)\frac{dT}{ds}\right) + \frac{J_c^2}{\sigma(T,s)} = 0, \quad (2)$$

where $J_c = \sigma dV/ds$ = constant is the current density in the conductor, which satisfies $$\int_0^L (J_c/\sigma)ds = V_0,$$

where s is the position along the CNT fiber, L is the total length (half length) of the single vertical fiber (looped fiber), and $V_0$ is the voltage drop along the fiber from the top of the emitter to the cathode base, and is much smaller than the gap voltage. For simplicity, we assume L to be the same as the height of the emitter, L=h (FIG. 2). The boundary conditions for Equation (2) are T(s=0)=T(s=2L)=T$_0$=320 K for the looped fiber (i.e., both ends are attached to the cathode base at room temperature); and T(s=0)=T$_1$=T$_0$=320 K and T(s=L)=T$_2$ for the single vertical fiber (i.e., one end is attached to the cathode based at room temperature and the other end is at temperature T$_2$=580° C. (853 K), which is estimated from FIG. 6 (image d)). Equation (2) is solved with these boundary conditions to give the temperature distribution along the CNT fibers.

By assuming constant electrical conductivity σ=σ$_0$ and linear temperature dependence of thermal conductivity κ=κ0+κ'(T−T$_1$), Equation (2) can be solved analytically. The maximum temperature for the looped fiber and for the single vertical fiber is found to be, $$T_{max} = T_0 + \frac{\kappa_0}{\kappa'}\left(\sqrt{1 + \frac{\kappa' V_0^2 \sigma_0}{4\kappa_0^2}} - 1\right), \text{Looped fiber} \quad (3)$$

$$T_{max} = T_1 + \frac{\kappa_0}{\kappa'}\left(\sqrt{1 + \frac{\kappa' T_\Delta^2}{4V_0^2\sigma_0}\left(\frac{V_0^2\sigma_0}{\kappa_0 T_\Delta} + \frac{\kappa' T_\Delta}{\kappa_0} + 2\right)^2} - 1\right), \quad (4)$$

Vertical fiber where, for the looped fiber, the location of T$_{max}$ always occurs at the top of the fiber loop (i.e., half the length of the total loop); for the vertical fiber, it occurs (measured from the cathode base) at $s_{max}$=L/2+L(κ'T$_0^2$/2σ$_0$V$_0^2$+k$_0$T$_0$/σ$_0$V$_0^2$) if $s_{max}$<L, otherwise at $s_{max}$=L with T$_{max}$=T$_2$. In Equations (3) and (4), To is the temperature at the cathode base, T$_\Delta$=T$_2$−T$_1$ is the temperature difference between the two ends of the vertical fiber, V$_0$=I$_0$R is the voltage drop from the top to the bottom of the emitter during field emission, I$_0$ is the emission current, and R is the total resistance of the emitter. When the temperature dependence coefficient κ'→0, Equations (3) and (4) become, $$T_{max} = T_0 + \frac{V_0^2\sigma_0}{8\kappa_0}, \text{Looped fiber} \quad (5)$$

$$T_{max} = T_1 + \frac{\kappa_0 T_\Delta^2}{8V_0^2\sigma_0}\left(\frac{V_0^2\sigma_0}{\kappa_0 T_\Delta} + 2\right)^2, \text{Vertical fiber} \quad (6)$$

Note that Equation (5) is identical to the V-T relation that is used in electrical contacts and ohmic heated nanowire.

By using σ0(320 K)=4.64×10$^5$ S/m, κ$_0$(320 K)=175.28 W/(mK), and κ'=−0.1298 W/(mK$^2$) (cf. linear fit in FIG. 8), the maximum temperature for the looped fiber is estimated to be T$_{max}$=254° C. (527 K) and 286° C. (559 K), from Equations (5) and (3), respectively; and the maximum temperature for the vertical fiber is estimated to be T$_{max}$=580° C. (853 K) at $s_{max}$=4 mm and 595° C. (868 K) at $s_{max}$=3.5 mm, from Equations (6) and (4), respectively. It is clear that including the negative linear dependence of the thermal conductivity κ' gives a higher maximum temperature, yielding a closer fit to the measured temperature distribution data in FIG. 6. A more accurate polynomial fit for κ(T) and a linear fit for σ(T) are also used in Equation (2) to numerically calculate the maximum temperature, giving T$_{max}$=300° C. for the looped fiber and T$_{max}$=600° C. at S$_{max}$=3.1 mm for the vertical fiber, which are the closest fit to the experimental measurements in FIG. 6. The results that were obtained from the experiments and from theory under various assumptions are summarized in Table 1. Despite the agreement with experiments, however, it should be reemphasized that the model in Equation (2) does not take into account the effects of the local emission site that is induced from fiber imperfection.

TABLE 1

Comparison of the measured maximum temperature and its location for both the vertical and looped fiber emitters, with the theory [27] of Equation (2) under various assumptions.

| Carbon Nanotube (CNT) Fiber Emitter | | Measured | Constant σ and κ | Constant σ and Linear κ(T) | Linear σ (T) and Polynomial Fit to κ(T) |
|---|---|---|---|---|---|
| Vertical | T$_{max}$ [° C.] | ~600 | 580 | 595 | 600 |
| | S$_{max}$ [mm] | ~3.0 | 4 | 3.5 | 3.1 |
| Looped | T$_{max}$ [° C.] | ~300 | 254 | 286 | 300 |
| | S$_{max}$ [mm] | ~4 | 4 | 4 | 4 |

In the above calculation, in order to give the best fit, the voltage drop across the emitters was adjusted to be V$_0$=0.79 V and 0.61 V for the looped and the vertical fiber, respectively. These values are equivalent to a CNT fiber emitter resistance of $R_{loop}=V_0/I_0=0.79$ V/3 mA=263Ω and $R_{vertical}=V_0/I_0=0.61$ V/3 mA=203Ω, which are much higher than the direct estimation of $R=(1/\sigma_0)L/\pi r^2=24\Omega$ for the single vertical fiber (and R/2=12Ω for the looped fiber due to the parallel connection of two resistors, cf. FIG. 2, image (b)).

Without being bound by theory, several possible explanations are speculated as follows. First, even though the CNT fibers that were installed for the two emitters and for the σ and κ measurement are from the same fabrication batch, it was noticed that there were significant variations on the thermal conductivity values from sample to sample, as well as the number of measurements. We observed about 30% variation among the samples and 2 to 5% variation among the measurements of thermal conductivity. While the origin of this variation is yet to be identified (one possible origin is poor contact between the CNT fiber and the epoxy), the error during the conductivities measurement may lead to the difference in the calculations for the emitter resistance. It is also possible that the high current cycles during the FE measurement may have conditioned and damaged a fraction of the CNT fibers, resulting in a different σ and κ from those in the pristine samples that were used for the 3 Omega measurement. Another speculation is that during FE, only a small percentage of the CNT fibrils (sub-fiber units, ~20-50 nm in diameter, formed by CNT tubes) in the fiber were active to conduct current for field emission, which is postulated based on the fact that only a small fraction of the surface area of the emitter tip field emit. It is also important to note that near the top of the looped fiber, only one side of the fiber faces the anode to emit current (FIG. 2, image (b)). Because of the high inter-tube resistance, the resistance of the small fraction of conducting fibrils in a CNT fiber during field emission will be significantly higher than that of the overall macroscopic fiber.

CONCLUSIONS

We have developed a looped CNT fiber arrangement that offers a significant advantages over the existing single vertical fiber arrangements, particularly within field emitters and related devices. We have studied the field emission and temperature distribution from a looped CNT fiber and compared it with a single vertical CNT fiber from the prior art. For both emitters, the field emission current level of mA can be easily reached with an applied voltage of <1000 V, demonstrating their excellent field emission properties. For a given applied voltage, the single vertical CNT fiber gave a higher emission current because of its higher field enchantment factor. However, at the same emission current of 3 mA, the maximum temperature of the looped fiber (~300° C.) was significantly lower than that of the vertical fiber (~600° C.). The temperature dependent electrical and thermal conductivities were also measured for the CNT fiber. Based on these measured conductivities, the maximum temperature and its location in the fibers were compared with a recent theory on joule heating of a one-dimensional conductor. The measured temperature distribution for both the looped and vertical CNT fibers were well fitted with the theory by adjusting the voltage drop across the emitter. Our novel configuration of a looped CNT fiber provides the opportunity to significantly improve the thermal management of field emitters, which may be expected to improve the reliability and lifetime of field emitters for high power and high current operations.

Figure 9:
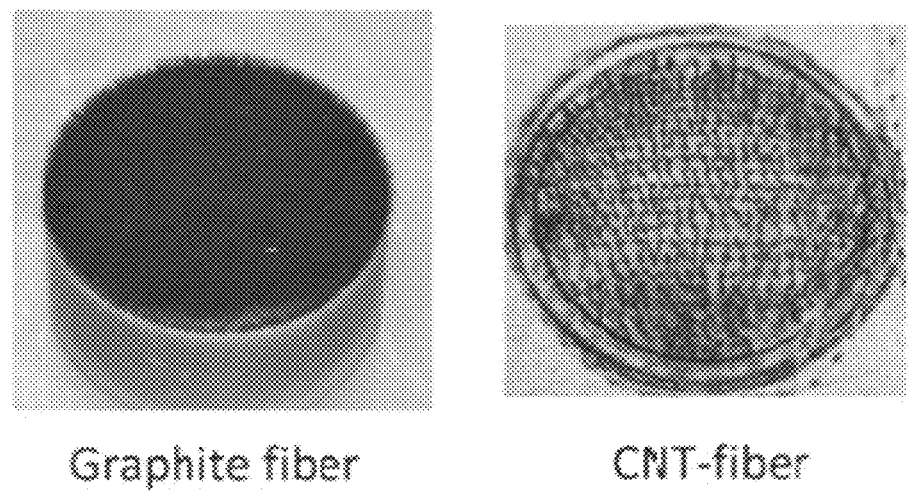
FIG. 9 presents a prior art field emission array of graphite fiber, a CNT-fiber array according to an embodiment of the present invention, and a performance comparison between a CNT array and carbon velvet.
Figure 9:
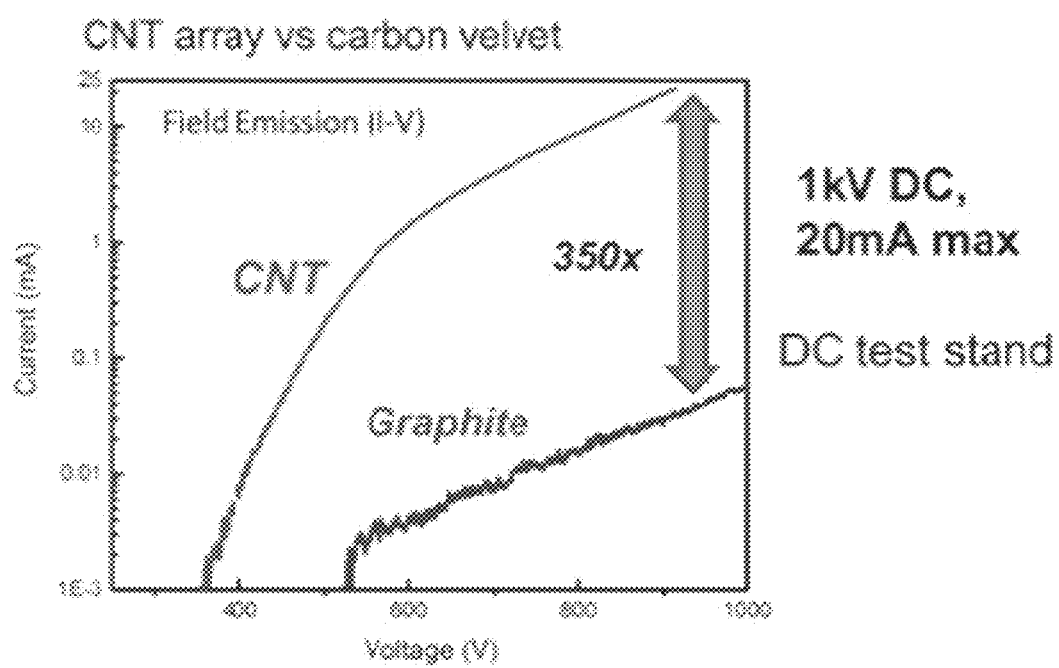

An exemplary use of this invention is as a cathode electrode for vacuum electronic devices. The cathode in a vacuum tube or other vacuum system emits an electron beam into the evacuated space of the tube. Hot cathodes operate by thermionic emission and require excessive heating (i.e. 1,600-2,000° C.) of the cathode for electron emission to occur. This is in contrast to a cold cathode, which does not have a heating element, and operates by field emission, whereby electrons are emitted from the cathode under the influence of an applied electric field. Carbon nanotube (CNT) fiber cathodes operate in the cold field emission mode and are capable of emitting a high current density electron beam. Field emission cathodes made from looped CNT fibers have been demonstrated to operate at much lower field strengths, producing 350× more current for the same applied field (see FIG. 9). This leads to lower power requirements and lower temperature operation, resulting in less plasma formation in the vacuum gap and more efficient device operation (see FIG. 10).

Figure 11:
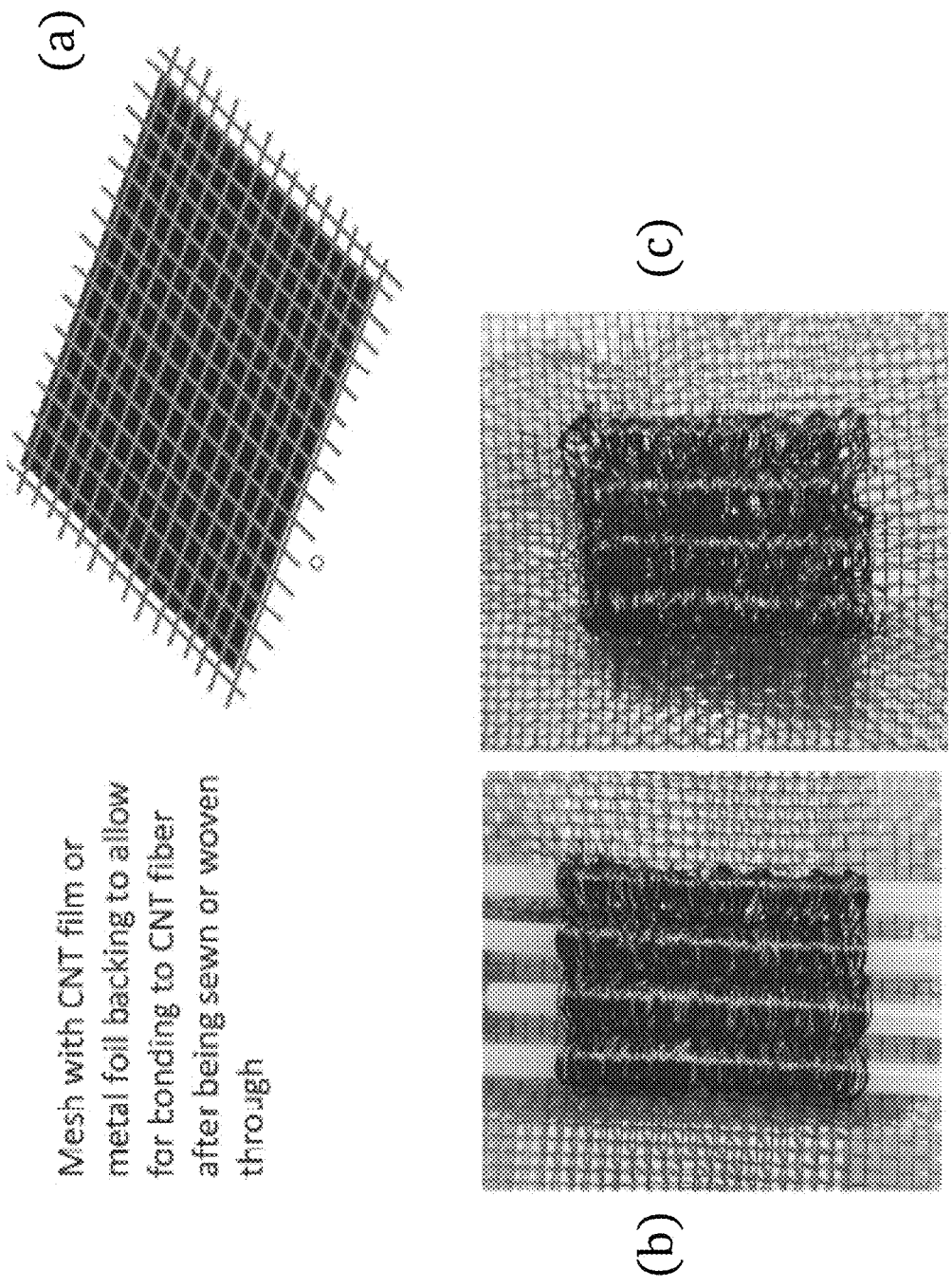
FIG. 11 presents a depiction of a substrate with a conductive backing material as well as two variations of looped CNT fiber structures according to embodiments of the present invention.

The invention includes looped carbon nanotube (CNT) fibers that are woven, sewn, or knitted into a substrate which may be a metallic wire mesh, metal foil, conductive cloth, CNT-fiber cloth, or some combination of these substrate components. FIG. 11 (image (a)) depicts a mesh with a conductive backing material, e.g. metal foil, CNT film, to provide electrical continuity with the CNT-fiber loops. The images (b)-(c) of FIG. 11 depict a conductive mesh, e.g. copper, having a plurality of CNT-fiber loops arranged in rows affixed thereto. Image (b) of FIG. 11 depicts several cylindrical rods forming a guide or loom around which the CNT-fiber loops may be formed. The rods are removed in image (c). The CNT fibers are tens of microns in diameter. Multiple individual fibers may be woven into threads or ropes that are several millimeters in diameter. According to an embodiment of the present invention, the CNT fibers are sewn into the substrate to form loops that protrude above the substrate surface like a looped carpet. On the underside of the substrate a conductive contact may be included between the CNT fibers and the metallic substrate. The electrical contact could be made by one of several techniques, including electroplating, silver or graphite epoxy, or epoxies containing nano-structured carbon, e.g. CNTs or graphene flake. The loops serve as emission sites from which the electrons are emitted when an electric field is applied about the loops.

Figure 12:
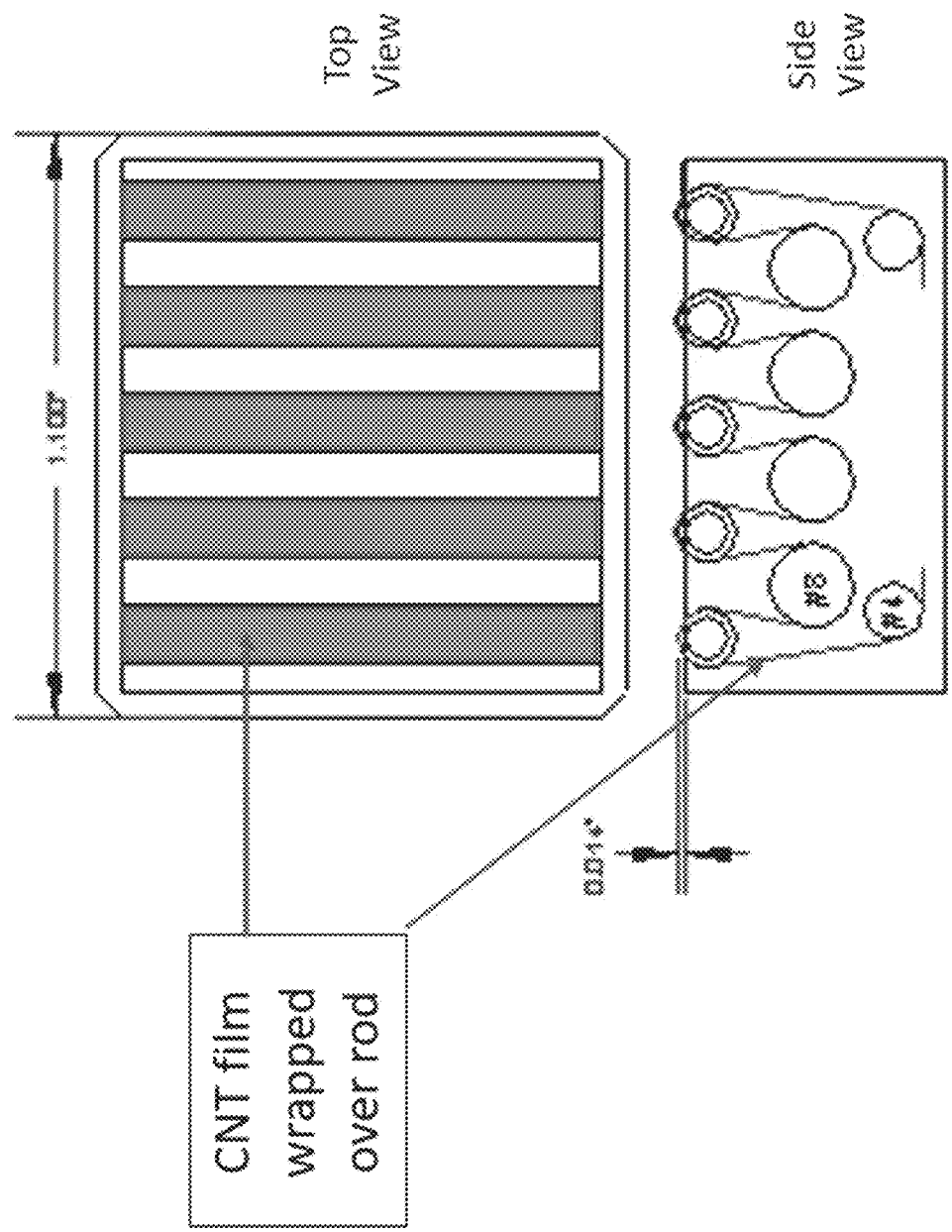
FIG. 12 presents strips of CNT film or tape arranged around an array of rods suitable for forming a CNT film cathode or carpet structure according to an embodiment of the present invention.
Figure 13A:
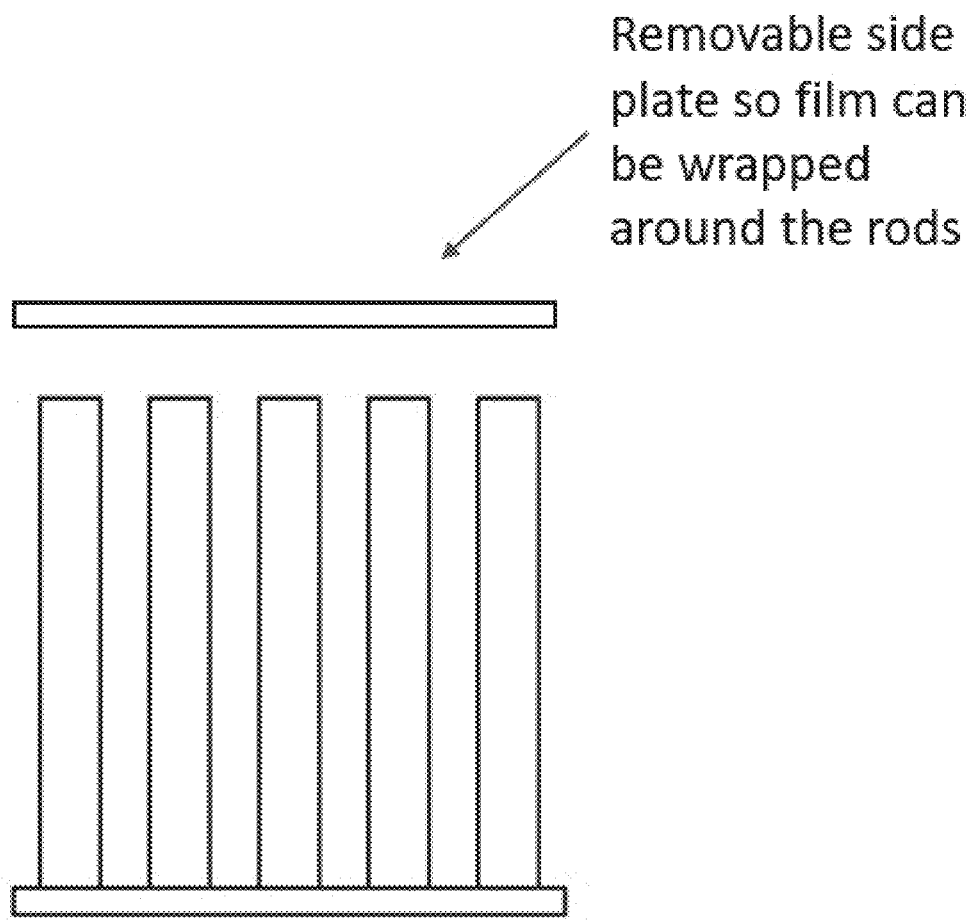
FIG. 13A presents a top view of a rod array mechanism suitable for forming a CNT film cathode or carpet structure.
Figure 13B:
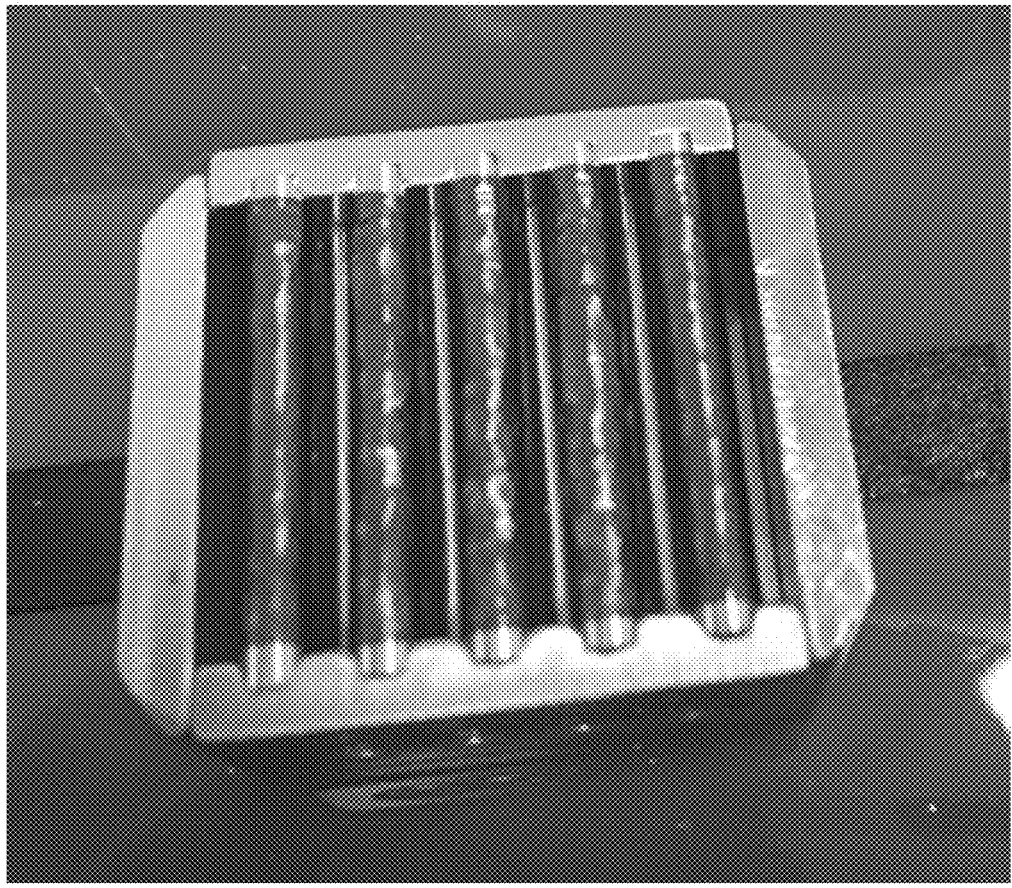
FIG. 13B presents a perspective view of the mechanism of FIG. 13A.

The CNT fiber may be woven through the metallic mesh or sewn through a metal foil or mesh/woven backing material/substrate with commercial sewing machine type equipment, or may be woven using existing carpet or textiles manufacturing machines (see FIGS. 12-13A) which are known for making fiber loops. The top side of the cathode carpet structure consist of CNT fiber loops sitting on top of, and extending from, the substrate like a loop carpet. The bottom side of the substrate may comprise the CNT fibers bonded to the metallic substrate to provide reliable electrical contact. The conductive bond may be made by one of several techniques, e.g. electroplating, or epoxies that contain silver or other metals, graphite, or nanostructured carbon, including CNTs and graphene flakes. After the bond is created between the substrate and the CNT fibers, the device may then be bonded to a planar or cylindrical metal or electrically-conductive structure for larger area coverage.

In another embodiment, the CNT fiber carpet structure may be formed in a single operation in a 3D knitting process. The final structure may be comprised completely of CNT fibers or be a hybrid structure with the CNT fibers used for the loops and another type of thread used as the substrate material. For a hybrid structure the metallic mesh and the CNT fiber are woven together in one piece. In this case, the metallic (or other material) thread and CNT fiber would have to be woven together into a mesh structure, and the CNT fiber loops would extend out above the metallic thread of the substrate.

Figure 14A:
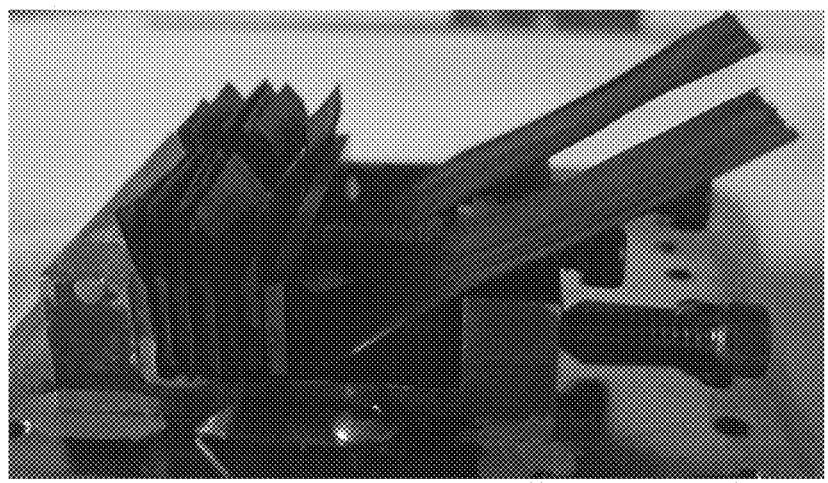
FIGS. 14A-14C presents views of a CNT film or ribbon woven around a stack of conductive plates.
Figure 14B:
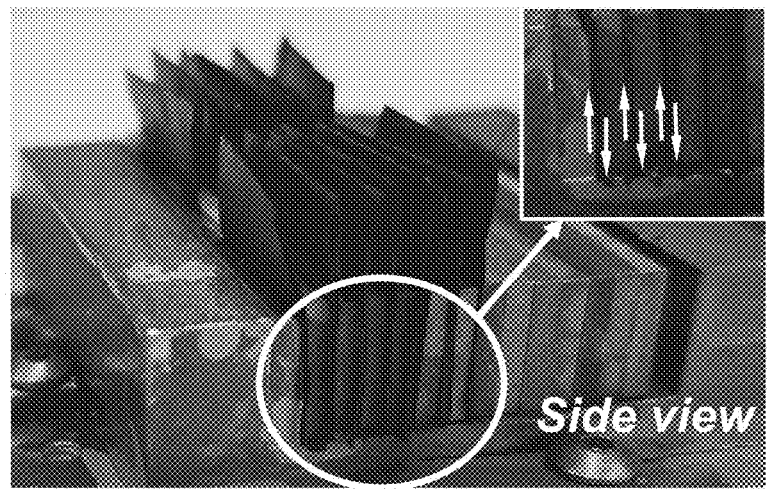
Figure 14C:
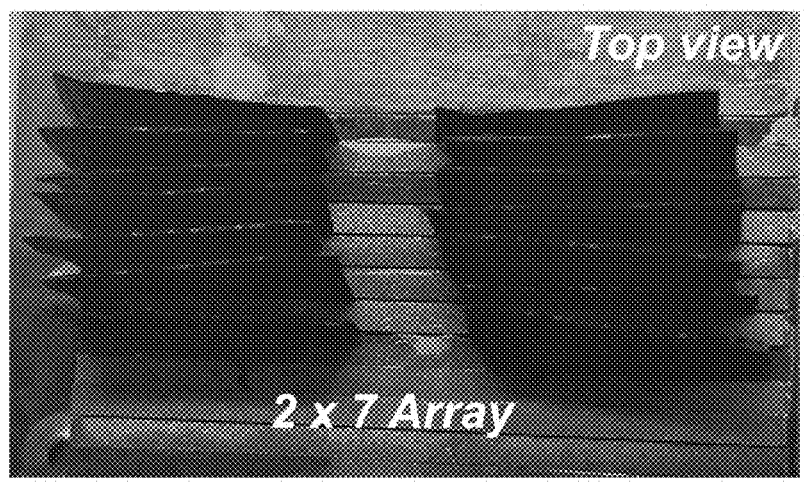

This carpet structure device could also be made with CNT tape that is several millimeters wide. If a metallic mesh was used as a substrate the holes would have to be big enough to accommodate the CNT films which are significantly wider than the CNT fibers. In the alternative, the film can be folded and sandwiched between metallic tabs as shown in FIGS. 14A-14C or pulled over and under adjacent rods as shown FIG. 13B. FIGS. 14A-14C present side views and a top view of CNT films or ribbons arranged around and between metallic tabs (or plates) so that an array of looped CNT films extends therefrom. The two side views (FIGS. 14A-14B) depict a clamped arrangement of the stack of metallic or conductive tabs, with the CNT films arranged in a serpentine fashion around the tabs. FIG. 14C depicts a top view of the two CNT films each having seven (7) loops extending from the stack of tabs. These approaches are easily scalable to make large area structures, either as a singular unit or as a series of smaller components connected together.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An apparatus comprising
a backing material; and
a plurality of looped carbon nanotube (CNT) fiber conductors fixed to the backing material and extending outward from the backing material in an array, wherein the CNT fiber conductor comprises a first end and a second end, the first end fixed to the backing material, and the second end fixed to the backing material a predetermined distance from the first end in order to form a loop of the CNT fiber conductor extending away from a backing material surface.

2. The apparatus of claim 1, wherein the CNT fiber conductor comprises at least one of a CNT thread, a CNT fiber, a CNT film, and a CNT ribbon.

3. The apparatus of claim 1, wherein the backing material comprises a conductive material.

4. The apparatus of claim 3, wherein the conductive material is one or more of a metallic mesh, a metallic fabric, a metal foil, a CNT film, and a conductive cloth.

5. The apparatus of claim 3, further comprising a conductive bond between the backing material and the CNT fiber conductor.

6. The apparatus of claim 5, wherein the conductive bond is one or more of a conductive adhesive, a carbon-based epoxy, a silver epoxy, a CNT-containing adhesive, a graphene-containing adhesive, and electroplating bond.

7. At least one of a field emitter, and electron emitter, and a conformable electrode comprising the apparatus of claim 1.

8. An apparatus comprising
a backing material; and
a plurality of looped carbon nanotube (CNT) fiber conductors fixed to the backing material at both ends and extending outward from the backing material in an array, wherein the CNT fiber conductor is woven into the backing material to form a plurality of loops of the CNT fiber conductor extending away from a backing material surface.

* * * * *